United States Patent Office 2,962,520
Patented Nov. 29, 1960

2,962,520

PHOSPHONIC ACID ESTERS

Gerhard Schrader, Wuppertal-Cronenberg, Germany, assignor to Farbenfabriken Bayer Aktiengesellschaft, Leverkusen, Germany, a corporation of Germany No Drawing. Filed Oct. 27, 1958, Ser. No. 769,578

Claims priority, application Germany Nov. 2, 1957

10 Claims. (Cl. 260—461)

The present invention relates to and has as its objects new valuable pest control agents with chiefly insecticidal action and a process for their manufacture. Generally the new compounds of the present invention may be represented by the following formula

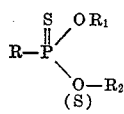

in which R stands for a phenyl- or lower alkyl-substituted vinyl radical, $R_1$ stands for a lower alkyl radical up to 4 carbon atoms, and $R_2$ stands for a lower alkyl mercapto-substituted alkyl radical. These compounds advantageously may be prepared by reacting the corresponding appropriately substituted thionophosphonic acid ester halides with the correspondingly appropriately substituted mercapto alkyl mercaptans or substituted mercapto alkanols in the presence of acid-binding agents as it is to be seen from the following reaction scheme:

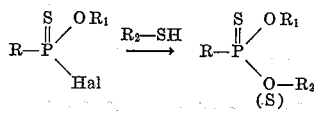

(in these formulae the symbols R, $R_1$ and $R_2$ have the same significance as given above, and Hal stands for preferably chlorine or bromine).

This reaction expediently is carried out in inert organic solvents such as alcohol, acetone, ethyl methyl ketone, benzene, and the like. Suitable acid-binding agents useful for carrying out the above reaction are especially alkali metal alcoholates, preferably sodium ethylate. The reaction furthermore is carried out at room temperature or at slightly elevated temperatures up to about 100° C.

The new vinyl phosphonic acid esters or thiophosphonic acid esters are applied in the manner customary for other phosphorous insecticides, i.e. preferably in combination with suitable solid or liquid diluents or extenders. Solid extenders are for example chalk, talc, bentonite and charcoal. The chief liquid diluent is water, the addition of a dissolving agent and emulsifier being necessary in most cases. The average activity of the compounds according to the invention is of the order of 0.0001–0.1% against ordinary aphids and spider mites. A remarkable property of a majority of the compounds according to the invention is their action on eating insects such as caterpillars.

Surprisingly, the toxicity of the new compounds is not very high, it is on the average of the order of 25 to 250 mg./kg. tested on rats per os.

To show the special utility of the inventive compounds the following ester has been tested against caterpillars:

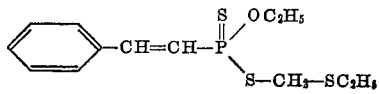

Aqueous solutions of the aforementioned compound have been prepared by admixing it with the same amount of an auxiliary solvent (acetone). A commercial emulsifier (benzyl hydroxy diphenyl polyglycol ether) is added in an amount of 20% by weight referred to active ingredient. This premixture then is diluted with water to the desired concentration. The test has been carried out as follows: against caterpillars of the type diamond back moth (Plutella maculipennis): white cabbage has been sprayed drip wet with aqueous emulsions as prepared above in a concentration as shown below. Caterpillars (10 each) have been placed on the sprayed leaves of the white cabbage. The living status has been determined after 24 hours and 48 hours. The following results have been obtained: caterpillars are killed completely with 0.1% concentrations of the above ester.

The following examples are given for the purpose of illustrating the invention.

Example 1

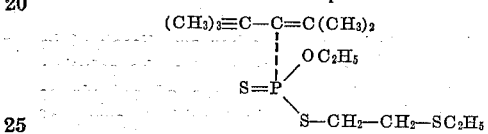

32 grams of β-ethyl-mercapto-thioethyl ether are dissolved in 120 mililitres of anhydrous alcohol. A sodium ethylate solution containing ¼ mol of dissolved sodium is added thereto at 30° C. 65 grams of diisobutenyl thionophosphonic acid ethyl ester chloride are then added drop-wise with further stirring at 30° C. The mixture is after-stirred at the said temperature for another hour and then worked up in usual manner; 60 grams of the new ester of B.P. 125° C./0.01 mm. Hg are thus obtained. Yield: 71% of the theoretical.

The water-insoluble ester shows a mean toxicity of 50 mg./kg.

By the same method but using instead of 65 grams of diisobutenyl-thionophosphonic acid ethyl ester chloride the equimolecular amount of the corresponding methyl ester there is obtained the ester of the following formula

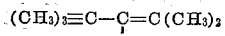
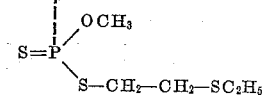

Example 2

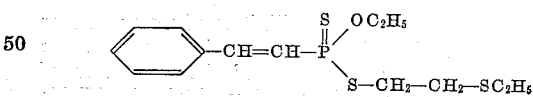

32 grams of β-ethyl mercapto-thioethyl ether are dissolved in 120 millilitres of anhydrous alcohol. A sodium ethylate solution containing ¼ mol of dissolved sodium is added thereto at 30° C. The mixture is after-stirred for a half hour, and 64 grams of styryl-thionophosphonic acid ethyl ester chloride are then added dropwise. The reaction product is kept at 30° C. for another hour, then worked up in usual manner. 64 grams of the new ester of B.P. 134° C./0.01 mm. Hg are thus obtained. The ester is water-insoluble.

The ester shows a mean toxicity of 10 mg./kg. on rats per os.

By the same way but using instead of 32 grams of β-ethylmercapto-thioethyl ether the equimolecular amount of the corresponding thiomethyl ether there is obtained the ester of the following formula

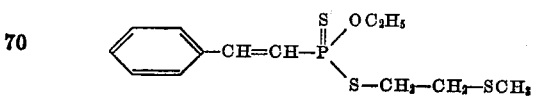

Example 3

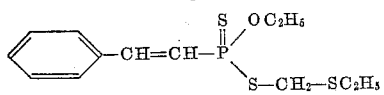

28 grams of α-mercaptomethyl-thioethyl ether are dissolved in 120 millilitres of anhydrous alcohol. At 30° C. there is added with stirring a sodium ethylate solution containing ¼ mol of dissolved sodium. The mixture is after-stirred at 30° C. for a half hour and 63 grams of styryl-thionophosphonic acid ethyl ester chloride are then added dropwise with stirring at the said temperature. The reaction product is kept at 30° C. for another half hour and then worked up in usual manner. 58 grams of the new ester of B.P. 130° C./0.01 mm. Hg are thus obtained. Yield: 73% of the theoretical.

Caterpillars are completely killed by 0.1% concentrations of this ester.

Example 4

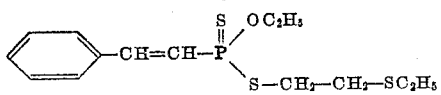

28 grams of β-oxethyl-thioethyl ether are dissolved in 150 millilitres of ethyl methyl ketone. To the solution there are added with stirring 40 grams of anhydrous powdered potassium carbonate mixed with 1 gram of copper powder. 64 grams of styryl-thionophosphonic acid ethyl ester chloride are then added dropwise with further stirring at 80° C. The reaction product is kept at 80° C. for a further 4 hours and then worked up in usual manner. 55 grams of the new ester are thus obtained as a yellow water-insoluble oil.

The ester shows at 0.01% concentrations marked ovicidal action on the ova of red spiders.

Example 5

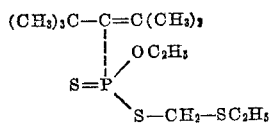

28 grams of α-mercaptomethyl-thioethyl ether are dissolved in 100 millilitres of anhydrous alcohol. A sodium ethylate solution containing ¼ mol of dissolved sodium is added thereto with stirring at 30° C. 65 grams of di-isobutenyl-thionophosphonic acid ethyl ester chloride are then added dropwise with further stirring at 30° C. The mixture is stirred at this temperature for an hour, the reaction product is then dissolved in 300 millilitres of benzene and shaken with 100 millilitres of water. After drying the benzenic solution over sodium sulfate the filtrate is fractionated; 60 grams of the new ester of B.P. 110° C./0.01 mm. Hg are thus obtained. Yield: 74% of the theoretical.

The new ester shows a mean toxicity on rats per os of 250 mg./kg.

I claim:
1. Phosphonic acid esters of the following formula

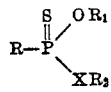

in which X is a chalcogen having an atomic weight between 16 and 32, R stands for a member selected from the group consisting of phenyl-substituted and lower alkyl-substituted vinyl radicals, wherein the lower alkyl radical contains up to 4 carbon atoms, $R_1$ stands for a lower alkyl radical up to 4 carbon atoms, and $R_2$ stands for a lower alkyl-substituted mercapto lower alkylene radical, wherein the lower alkyl and lower alkylene radicals contain up to 4 carbon atoms.

2. A phosphonic acid ester of the following formula

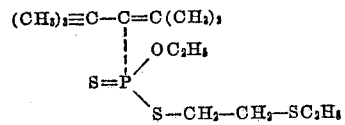

3. A phosphonic acid ester of the following formula

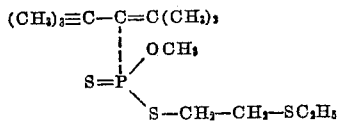

4. A phosphonic acid ester of the following formula

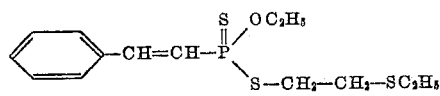

5. A phosphonic acid ester of the following formula

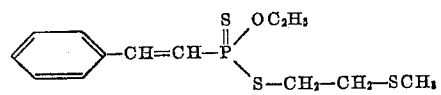

6. A phosphonic acid ester of the following formula

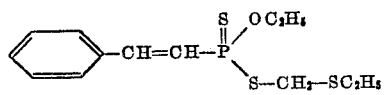

7. A phosphonic acid ester of the following formula

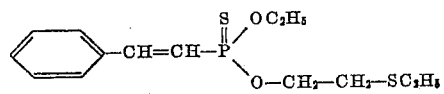

8. A phosphonic acid ester of the following formula

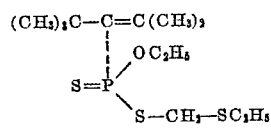

9. A phosphonic acid ester of claim 1 wherein the chalcogen is sulfur.

10. A phosphonic acid ester of claim 1 wherein the chalcogen is oxygen.

References Cited in the file of this patent
UNITED STATES PATENTS
2,881,201    Schrader _____ Apr. 7, 1959

UNITED STATES PATENT OFFICE
CERTIFICATION OF CORRECTION

Patent No. 2,962,520            November 29, 1960

Gerhard Schrader

It is hereby certified that error appears in the above numbered patent requiring correction and that the said Letters Patent should read as corrected below.

Column 1, line 29, for "alkyl" read -- alkylene --; lines 35 to 40, the center portion of the formula, for column 3, lines 20 to 24, the formula should appear as shown below instead of as in the patent:

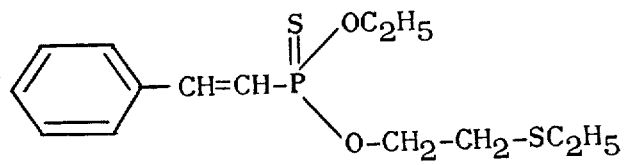

Signed and sealed this 6th day of June 1961.

(SEAL)
Attest:

ERNEST W. SWIDER
Attesting Officer

DAVID L. LADD
Commissioner of Patents